United States Patent
Wu

(10) Patent No.: US 11,885,361 B2
(45) Date of Patent: Jan. 30, 2024

(54) CONNECTOR

(71) Applicant: GETAC HOLDINGS CORPORATION, Taoyuan (TW)

(72) Inventor: Ssu-Yuan Wu, Taipei (TW)

(73) Assignee: GETAC HOLDINGS CORPORATION, Taoyuan (TW)

( * ) Notice: Subject to any disclaimer, the term of this patent is extended or adjusted under 35 U.S.C. 154(b) by 131 days.

(21) Appl. No.: 17/359,273

(22) Filed: Jun. 25, 2021

(65) Prior Publication Data
US 2022/0045458 A1 Feb. 10, 2022

Related U.S. Application Data

(60) Provisional application No. 63/063,865, filed on Aug. 10, 2020.

(30) Foreign Application Priority Data

Sep. 30, 2020 (CN) .......................... 202011059388.4

(51) Int. Cl.
*F16B 21/09* (2006.01)

(52) U.S. Cl.
CPC .......... *F16B 21/09* (2013.01); *F16B 2200/30* (2018.08); *Y10T 403/1624* (2015.01); *Y10T 403/602* (2015.01)

(58) Field of Classification Search
CPC ........ F16B 3/00; F16B 5/0036; F16B 5/0088; F16B 21/06; F16B 21/07; F16B 21/09; F16B 2001/0092; F16B 2200/30; Y10T 403/1616; Y10T 403/1624; Y10T 403/59; Y10T 403/60; Y10T 403/602; Y10T 403/61; Y10T 403/705; Y10T 403/7092; Y10T 403/7094

(Continued)

(56) References Cited

U.S. PATENT DOCUMENTS

| 3,743,147 | A | * | 7/1973 | Wilczynski | A45F 5/021 224/199 |
| 4,419,794 | A | * | 12/1983 | Horton, Jr. | A45F 5/02 24/669 |
| 5,026,016 | A | * | 6/1991 | Lisowski | F16B 21/09 248/314 |

(Continued)

FOREIGN PATENT DOCUMENTS

| GB | 2496613 A | * | 5/2013 | ........... A47B 96/068 |
| WO | WO-9857568 A1 | * | 12/1998 | ........... G08B 3/1058 |

*Primary Examiner* — Josh Skroupa
*Assistant Examiner* — Kevin J Baynes
(74) *Attorney, Agent, or Firm* — Cooper Legal Group, LLC

(57) ABSTRACT

A connector includes a base, a connecting part and a coupling piece. One end of the connecting part is connected to the base. The coupling piece is arranged on the other end of the connecting part, and includes a sliding channel having an open end located on a side edge of the coupling piece and an opposite closed end. A maximum linear distance of an outer periphery of the connecting part is less than that of the coupling piece. Another connector includes a base plate, two parallel side plates arranged on the base plate, a front plate connected to the two side plates and having a tapered positioning slot, and a positioning portion arranged on the base plate and adapted for reciprocal movement in a direction perpendicular to the base plate. The base plate, the two side plates and the front plate form an accommodating groove.

20 Claims, 12 Drawing Sheets

(58) Field of Classification Search
USPC .............. 224/197–200; 379/446, 447, 454; 396/419, 420, 425, 428
See application file for complete search history.

(56) References Cited

U.S. PATENT DOCUMENTS

| | | | | |
|---|---|---|---|---|
| 5,054,170 A * | 10/1991 | Otrusina | ................... | A45F 5/02 24/669 |
| 5,597,102 A * | 1/1997 | Saarikko | .............. | H04B 1/3833 224/904 |
| 5,833,100 A * | 11/1998 | Kim | ................... | B60R 11/0241 224/667 |
| 5,839,173 A * | 11/1998 | Otrusina | ................... | A45F 5/02 24/3.1 |
| 5,850,954 A * | 12/1998 | Dong-Joo | ............ | H04B 1/3888 24/3.12 |
| 5,850,996 A * | 12/1998 | Liang | ...................... | A45F 5/02 248/221.11 |
| 6,006,969 A * | 12/1999 | Kim | ...................... | A45F 5/021 224/272 |
| 6,059,156 A * | 5/2000 | Lehtinen | ............. | H04B 1/3833 248/225.11 |
| 6,283,348 B1 * | 9/2001 | Wang | ................... | H04B 1/3888 24/3.12 |
| 6,722,539 B2 * | 4/2004 | Iitsuka | ..................... | A45F 5/02 248/225.11 |
| 6,955,279 B1 * | 10/2005 | Mudd | ....................... | A45F 5/02 224/269 |
| 6,955,280 B2 * | 10/2005 | Saitoh | ................. | B60R 11/0241 224/547 |
| 7,832,606 B2 * | 11/2010 | Sin | ............................ | A45F 5/02 224/663 |
| 8,033,518 B2 * | 10/2011 | Schuchman | ........... | B60N 3/103 224/679 |
| 8,073,131 B2 * | 12/2011 | Bodkin | .................. | H04M 1/18 379/426 |
| 8,075,202 B1 * | 12/2011 | Chamberlayne | ..... | G03B 17/561 396/423 |
| 8,141,210 B2 * | 3/2012 | Colorado | ................ | A45F 5/021 24/3.12 |
| 2004/0232180 A1 * | 11/2004 | Badillo | ..................... | A45F 5/02 224/269 |
| 2005/0258204 A1 * | 11/2005 | Evans | ...................... | A45F 5/02 224/269 |
| 2009/0196596 A1 * | 8/2009 | Chamberlayne | ......... | A45F 3/14 396/420 |

* cited by examiner

CONNECTOR

The application claims the benefit of a U.S. Provisional Patent Application No. 63/063,865, filed on Aug. 10, 2020, the disclosure of which is hereby incorporated by reference herein in its entirety. The application further claims priority to a CN Patent Application No. 202011059388.4, filed on Sep. 30, 2020, the disclosure of which is also hereby incorporated by reference herein in its entirety.

BACKGROUND OF THE INVENTION

Field of the Invention

The present invention relates to a connector, and more particularly to a connector that achieves separation by means of rotational withdrawal.

Description of the Prior Art

Connectors are extensively applied in diversified commercial wearable products, such as smart wearable devices, police body-worn cameras (BWC), bicycle lighting lamps and military equipment. A plug of a connector has a metal shrapnel and a placement terminal of a wearable product has a recess, and the two match with each other to accordingly insert the connector into the wearable product and be mounted between structures, so as to be fitted and secured with each other.

However, due to insufficient rigidity of the shrapnel, the product is susceptible to permanent deformation in case of impact, resulting in a possible removal failure of the product.

SUMMARY OF THE INVENTION

In view of the above, a connector including a base, a connecting part and a coupling piece is provided in one embodiment. One end of the connecting part is connected to the base. The coupling piece is arranged on the other end of the connecting part, and includes a sliding channel. The sliding channel has an open end and a closed end opposite to each other, wherein the open end is located on a side edge of the coupling piece. A maximum linear distance of an outer periphery of the connecting part is less than a maximum linear distance of an outer periphery of the coupling piece.

A connector including a base plate, two side plates, a front plate and a positioning portion is further provided. The two side plates are arranged on the base plate, and are parallel to each other. The front plate is connected to the two side plates, and has a tapered positioning slot. The base plate, the two side plates and the front plate form an accommodating groove. The positioning portion is arranged on the base plate, and is adapted for reciprocal movement in a first direction perpendicular to the base plate.

In conclusion, the connectors provided by the embodiments of the present invention are, by means of rotational withdrawal, capable of preventing deformation of the positioning portion during a separation process, so as to reduce the probability of permanent deformation of the positioning portion to thereby improve the proper rate and durability of a product.

DETAILED DESCRIPTION OF THE EMBODIMENTS

Figure 1:
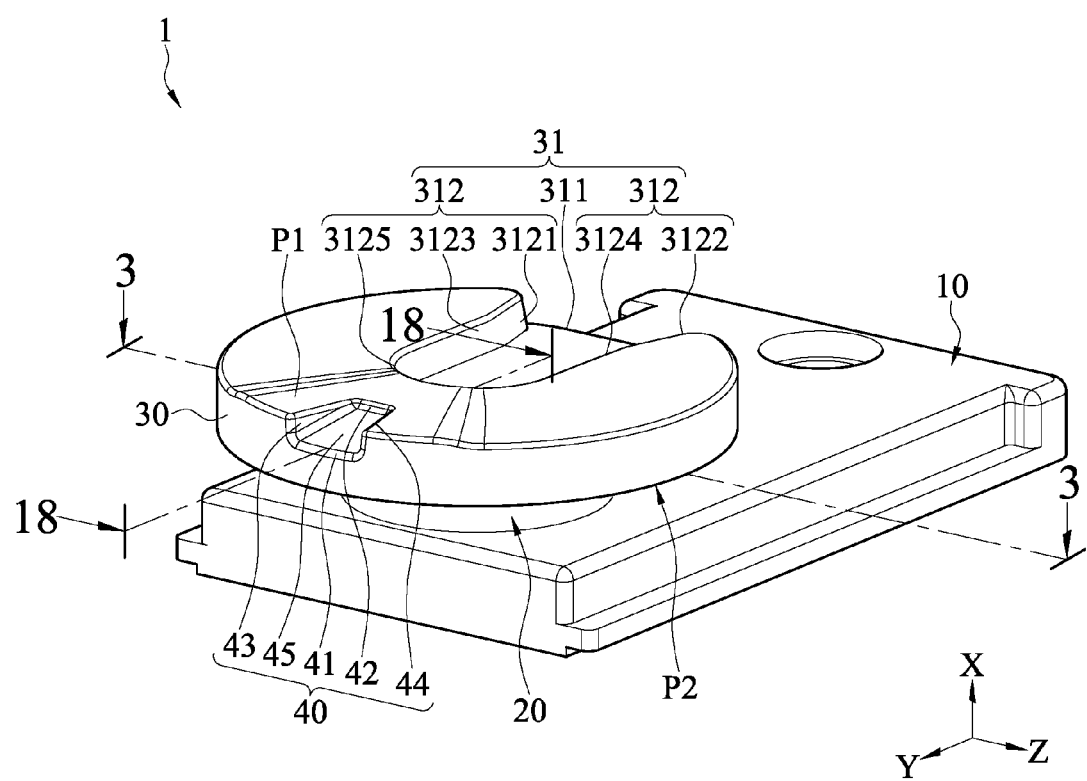
FIG. 1 is a three-dimensional diagram of a first connector according to a first embodiment of the present invention.

FIG. 1 shows a three-dimensional diagram of a first connector according to a first embodiment of the present invention. In some embodiments, the connector is applicable to diversified commercial wearable products, such as smart wearable devices, police body-worn cameras (BWC), bicycle lighting lamps and military equipment. A connector can be structurally divided into a plug connector and a receptacle connector, and the two may achieve coupling and separation effects by means of the geometric matching between the two. In the embodiments below, a first connector 1 is a plug connector.

As shown in FIG. 1, the first connector 1 includes a base 10, a connecting part 20 and a coupling piece 30. One end of the connecting part 20 is connected to the base 10. The coupling piece 30 is arranged on the other end of the connecting part 20, and includes a sliding channel 31. The sliding channel 31 has an open end 311 and a closed end 312 opposite to each other, wherein the open end 311 is located on a side edge of the coupling piece 30. As shown in FIG. 1, the side edge refers to any side along the outer periphery of the coupling piece 30. In this embodiment, if the coupling piece 30 is circular for example, the side edge is any position on the circumference; if the coupling piece 30 is rectangular, polygonal or irregularly shaped, the side edge is any side. In this embodiment, the first connector 1 may be integrally formed of, for example, a plastic material, by injection molding. The base 10 is rectangle in shape, and the geometry of the back side may be correspondingly designed according to a product to be loaded. In other embodiments, the base 10 of the first connector 1 may also be a circle, or a polygon such as a triangle or a pentagon in shape. In some embodiments, the first connector 1 may also be integrally formed of a metal material by casting. In other embodiments, the first connector 1 may also be formed of hybrid materials (e.g., the base 10 is formed of a plastic material, and the connecting part 20 and the coupling piece 30 are formed of metal materials) and be joined and fixed by means of locking, riveting or welding.

Figure 2:
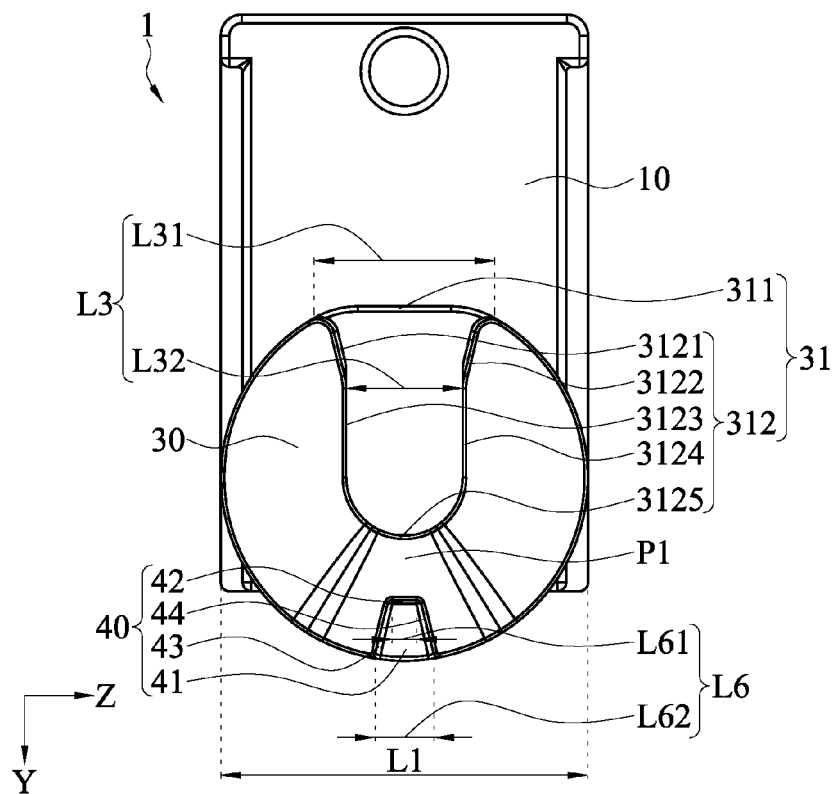
FIG. 2 is a top view of a first connector according to the first embodiment of the present invention.
Figure 3:
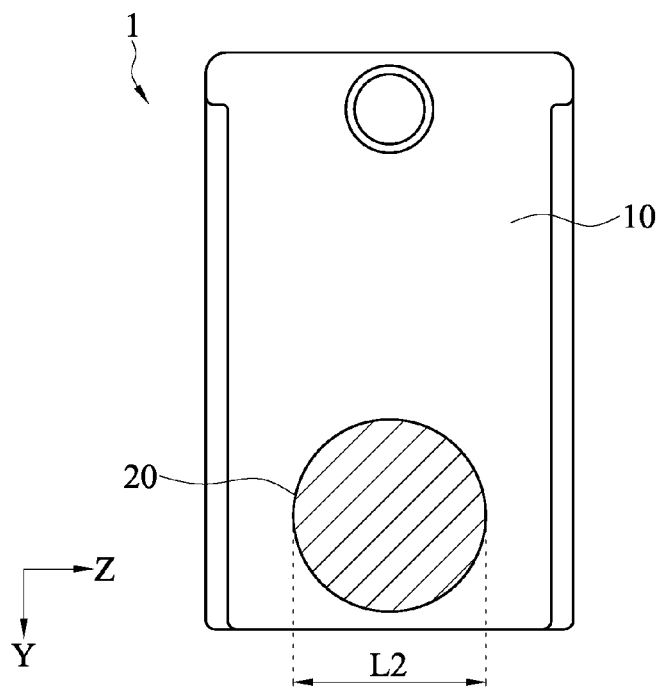
FIG. 3 is a section view of a first connector according to the first embodiment of the present invention.

FIG. 2 shows a top view of a first connector according to the first embodiment of the present invention. FIG. 3 shows a section view of a first connector according to the first embodiment of the present invention. As shown in FIG. 1 to FIG. 3, a maximum linear distance L2 of the outer periphery of the connecting part 20 of the first connector 1 is less than a maximum linear distance L1 of the outer periphery of the coupling piece 30. For example, in this embodiment, it is discovered that the maximum linear distance of the outer periphery of the coupling piece 30 is L1 when viewing the coupling piece 30 from the top view in FIG. 2, and the maximum linear distance of the outer periphery of the connecting part 20 from a top view of a cross section 3-3 in FIG. 3 is L2, and it is found that L2 is less than L1.

Figure 4:
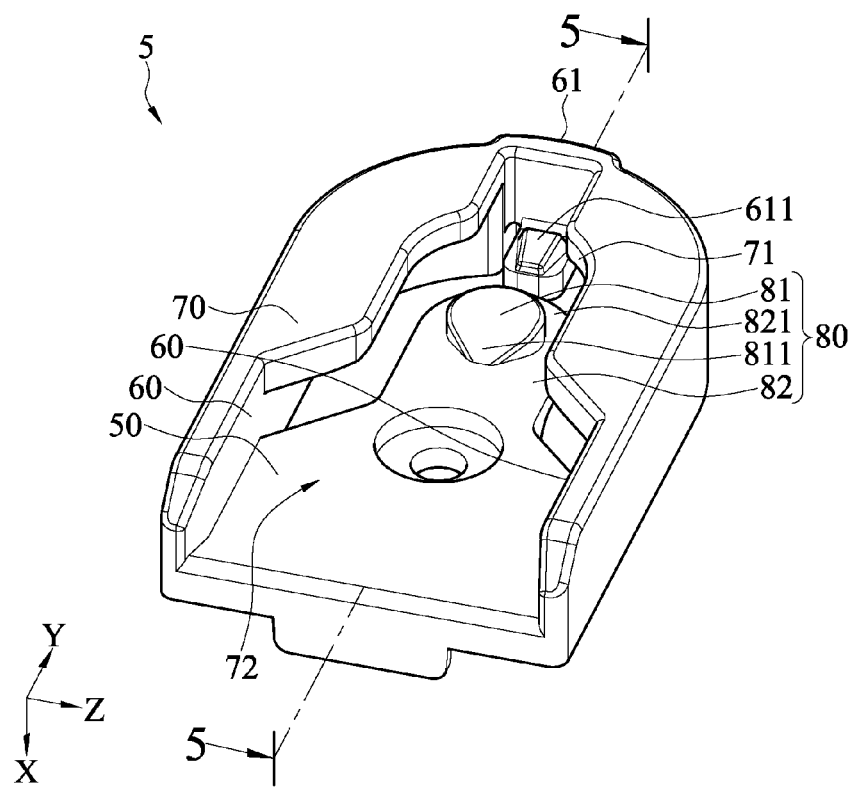
FIG. 4 is a three-dimensional diagram of a second connector according to the first embodiment of the present invention.
Figure 5:
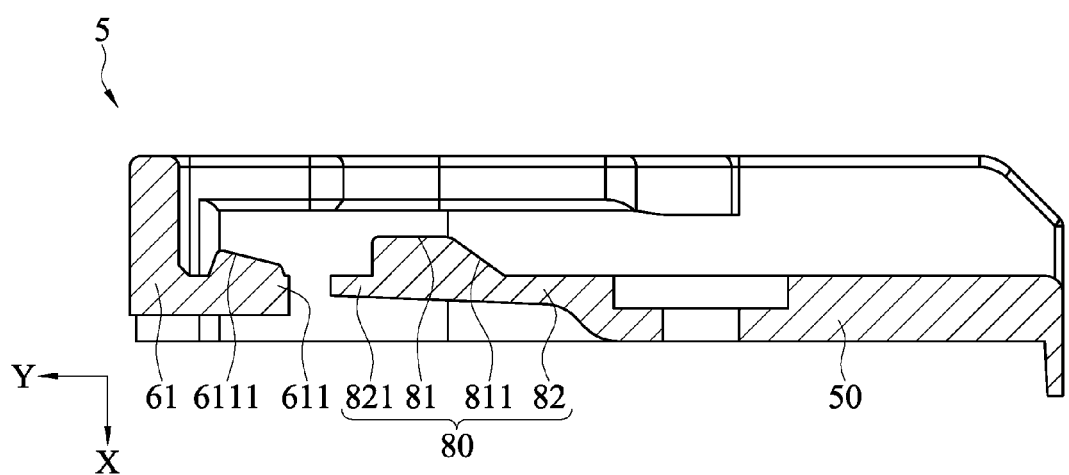
FIG. 5 is a section view of a second connector according to the first embodiment of the present invention.
Figure 6:
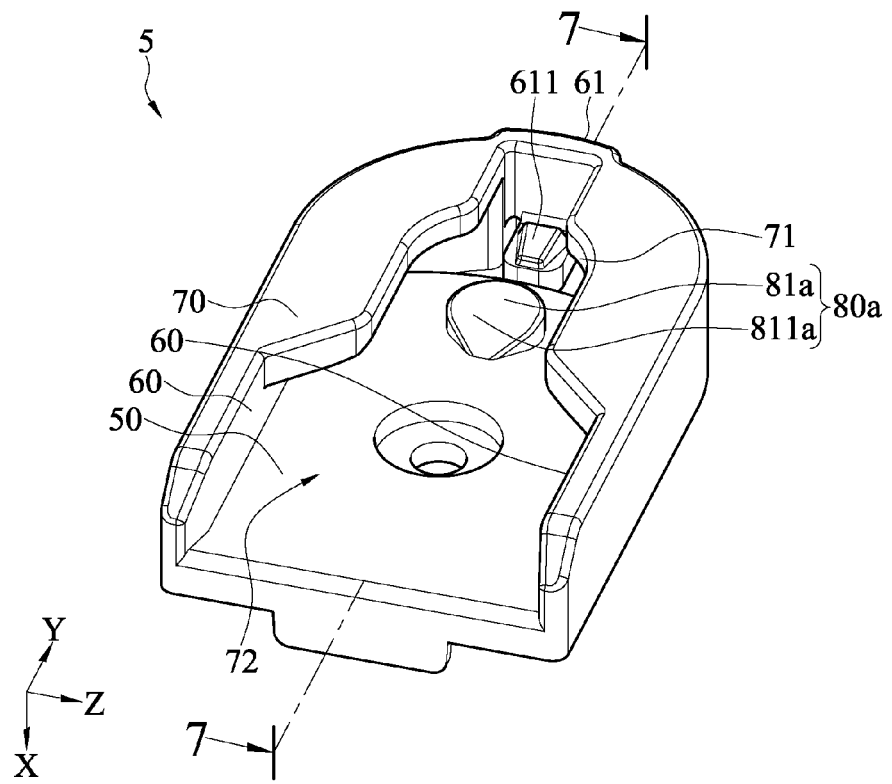
FIG. 6 is a three-dimensional diagram of a second connector according to a second embodiment of the present invention.
Figure 7:
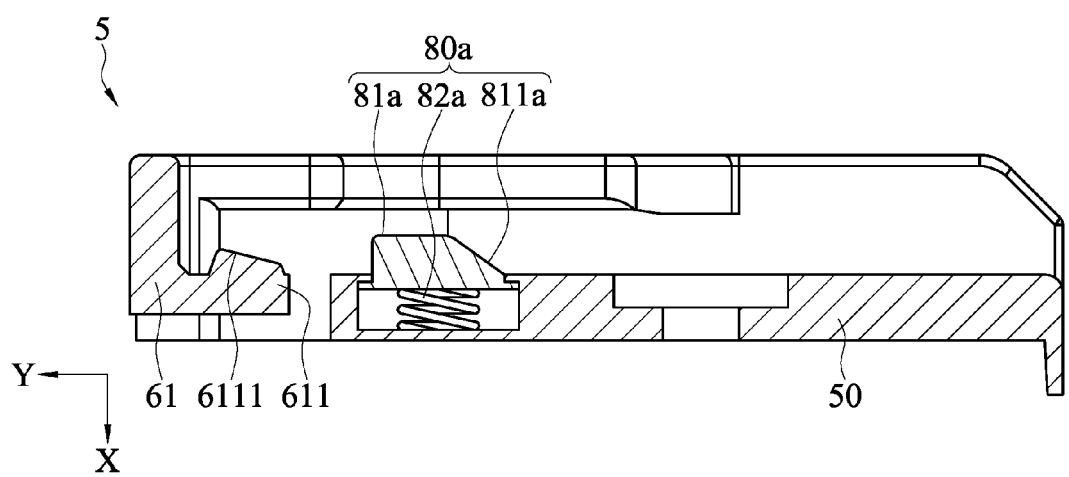
FIG. 7 is a section view of a second connector according to the second embodiment of the present invention.

FIG. 4 shows a three-dimensional diagram of a second connector according to the first embodiment of the present invention. FIG. 5 shows a section view of a second connector according to the first embodiment of the present invention. FIG. 6 shows a three-dimensional diagram of a second connector according to a second embodiment of the present invention. FIG. 7 shows a section view of a second connector according to the second embodiment of the present invention. A second connector 5 is the foregoing receptacle connector. For better illustration, xyz coordinates are marked where necessary in the drawings, as shown in FIG. 4. In the description below, a first direction is the x-axis direction, a second direction is the y-axis direction, a third direction is the z-axis direction, and the axes are perpendicular to one another.

As shown in FIG. 4 to FIG. 7, the second connector 5 includes a base plate 50, two side plates 60, a front plate 70 and a positioning portion 80. The two side plates 60 are arranged on the base plate 50, and are parallel to each other. The front plate 70 is connected to the two side plates 60, and has a tapered positioning slot 71. The base plate 50, the two side plates 60 and the front plate 70 form an accommodating groove 72. The positioning portion 80 is arranged on the base plate 50 and is adapted for reciprocal movement in a first direction perpendicular to the base plate 50. In the first embodiment, the positioning portion 80 is provided with mobility in the first direction via the design of an elastic arm 82; in the second embodiment, a positioning portion 80a is provided with mobility in the first direction via the configuration of an elastic element 82a—the associated details are to be given shortly.

The second connector 5 may be formed of a plastic or metal material or other materials. For example, in this embodiment, the second connector 5 is integrally formed of a plastic material by injection molding, and the base plate 50 is a rectangle in shape and has a back surface in a geometric design corresponding to a desired target structure for mounting. In some embodiments, the second connector 5 is integrally formed of a metal material by casting, or joined and made from multiple metal sheets formed by metal stamping. In some embodiments, the base plate 50 of the second connector 5 may also be a circle in shape or a polygon such as a triangle or a pentagon in shape.

As shown in FIG. 4 and FIG. 5, the positioning portion 80 includes a bump 81 and an elastic arm 82. The elastic arm 82 is connected to the base 50, and includes a mobile end 821 on the side away from the base plate 50. The bump 81 is provided on the mobile end 821. In this embodiment, the base plate 50 and the two side plates 60 are only partially connected; the part by which the elastic arm 82 that is directly connected to the base plate 50 is a fixed end, and the part on the other side that is not connected is the mobile end 821. The bump 81 is a cylindrical block, the bump 81 and the mobile end 82 are integrally formed, and the bump 81 is provided with mobility in the first direction (i.e., the x-axis direction) since the binding force of the mobile end 821 is weak. In some embodiments, the length of the connecting part and the length of the non-connecting part of the base plate 50 and the two side plates 60 may also be in other proportions, such as 2:1, 1:1, 1:2 and 1:3. If the elastic arm 82 needs a greater flexibility, the length of the non-connecting part may be set to be longer than the length of the connecting part, and vice versa, the length of the non-connecting part may be set to be shorter than the length of the connecting part, which depends on utilization requirements and is not specifically limited herein.

Referring to FIG. 6 and FIG. 7, the second embodiment shown in FIG. 6 and FIG. 7 differs from the foregoing first embodiment by the structure of the positioning portion. Details of the remaining structures can be referred from the first embodiment and are omitted herein. In this embodiment, the positioning portion 80a includes a protruding column 81a and an elastic element 82a, the protruding column 81a is protrudingly disposed on the base plate 50, one end of the elastic element 82a abuts against the base plate 50 and the other end abuts against the protruding column 81a, and the elastic element 82a provides the protruding column 81a with a restoring force. In this embodiment, the elastic element 82a is a spring, with one end fixed at the base plate 50 and the other end fixed at the protruding column 81a, and the protruding column 81a is a cylinder in shape. In some embodiments, the protruding column 81a may also be formed of a plastic or metal material, and the elastic element 82a may be a shrapnel, a rubber spring or a helical spring fixed between the protruding column 81a and the base plate 50 by means of welding, locking and riveting.

Figure 8:
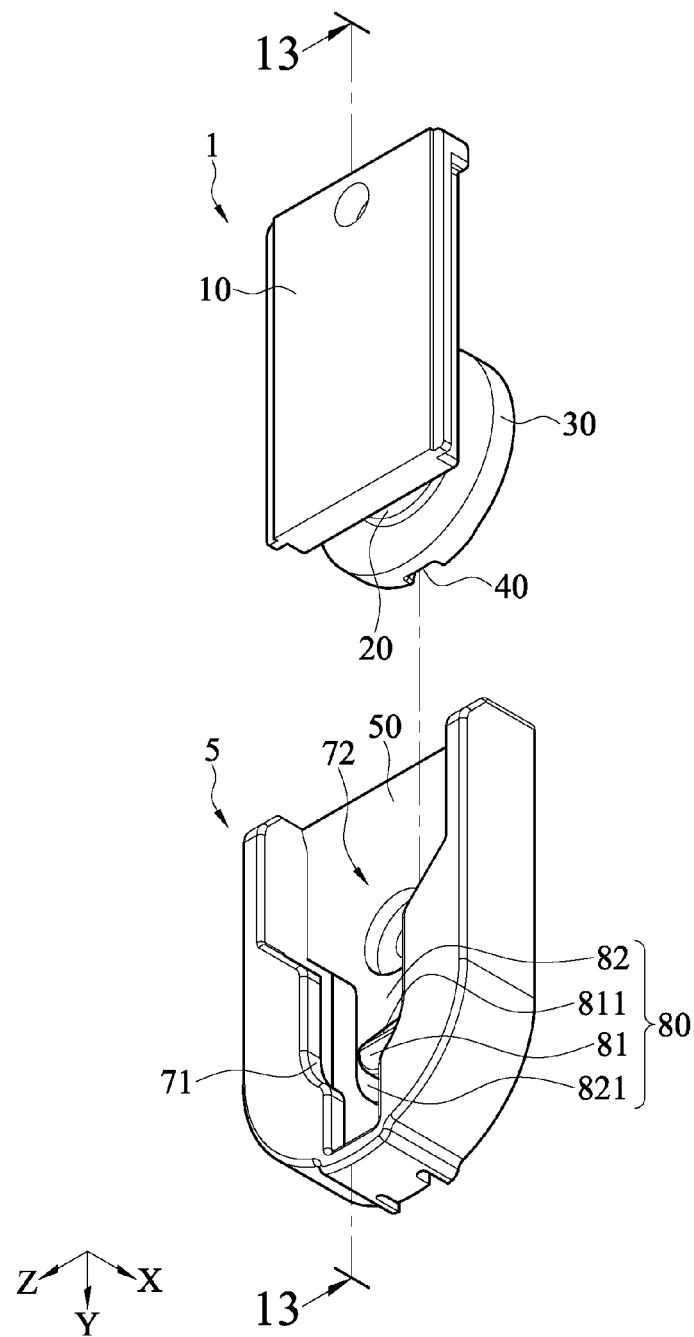
FIG. 8 is a first operation diagram of a connector according to the first embodiment of the present invention.
Figure 9:
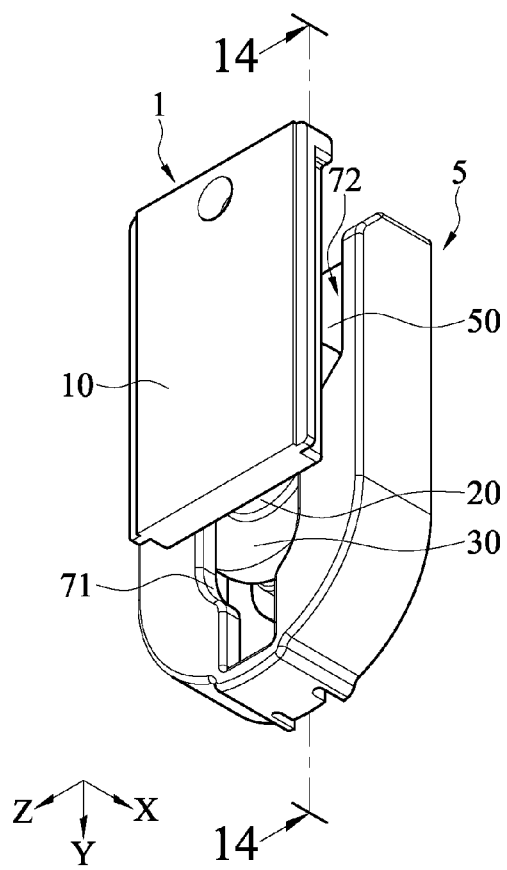
FIG. 9 is a second operation diagram of a connector according to the first embodiment of the present invention.
Figure 10:
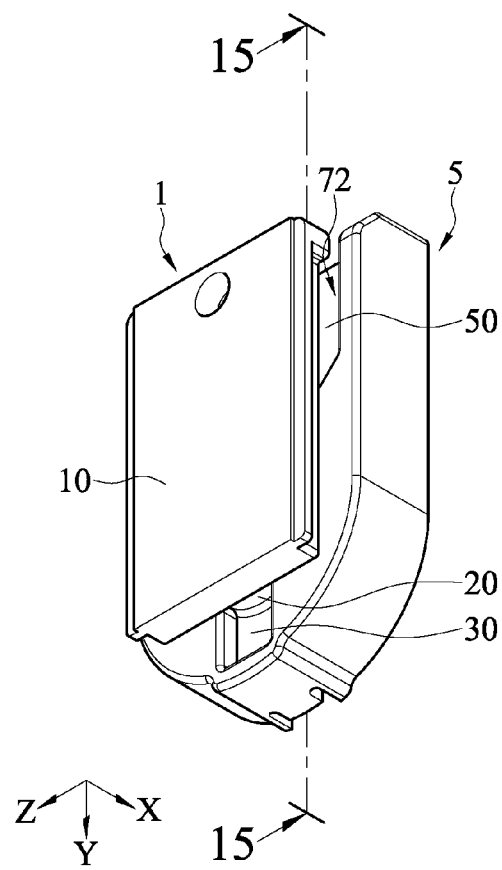
FIG. 10 is a third operation diagram of a connector according to the first embodiment of the present invention.
Figure 11:
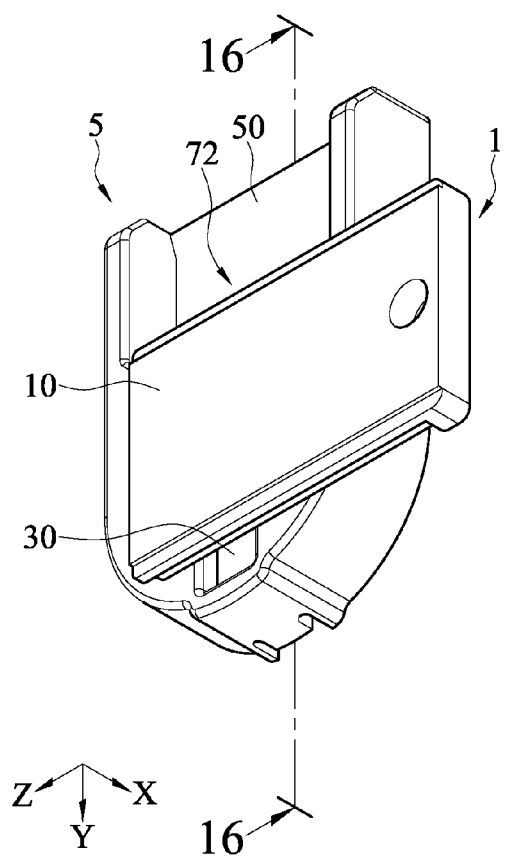
FIG. 11 is a fourth operation diagram of a connector according to the first embodiment of the present invention.
Figure 12:
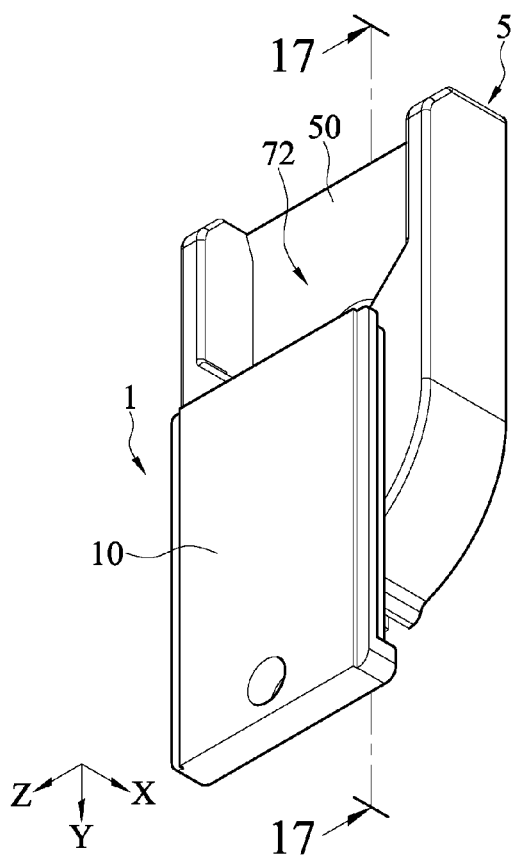
FIG. 12 is a fifth operation diagram of a connector according to the first embodiment of the present invention.
Figure 13:
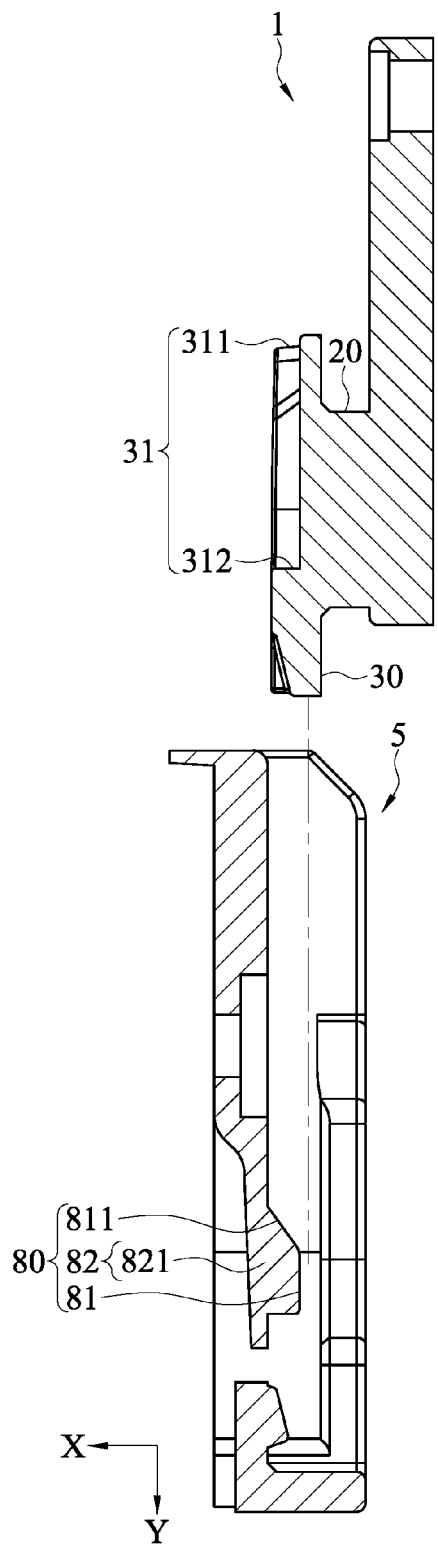
FIG. 13 is a first operation section view a connector according to the first embodiment of the present invention.
Figure 14:
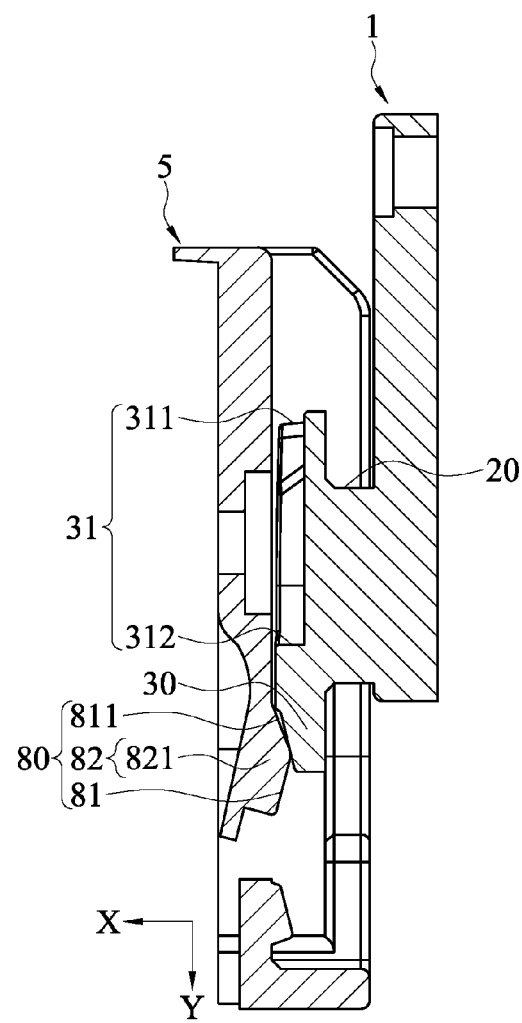
FIG. 14 is a second operation section view a connector according to the first embodiment of the present invention.
Figure 15:
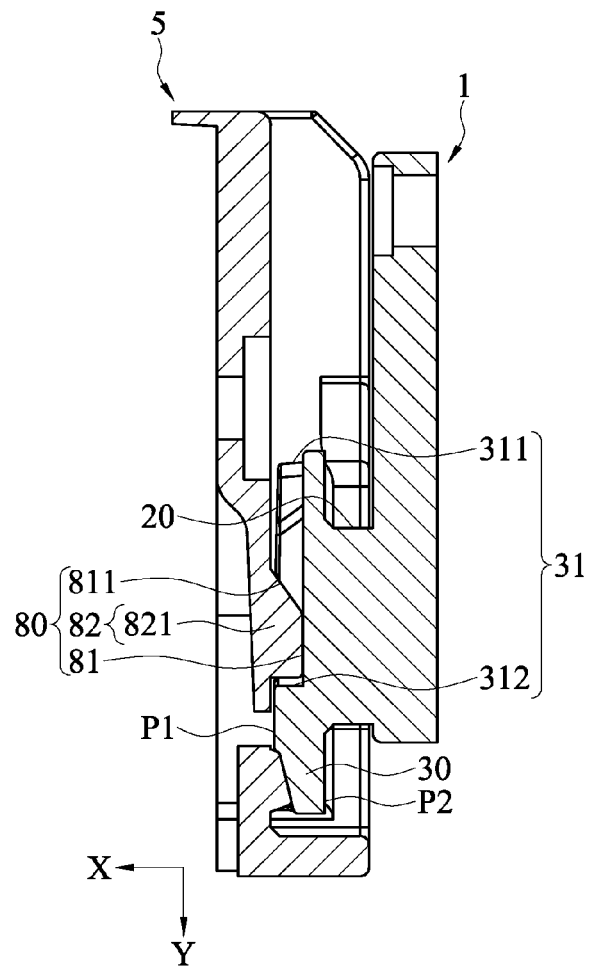
FIG. 15 is a third operation section view a connector according to the first embodiment of the present invention.
Figure 16:
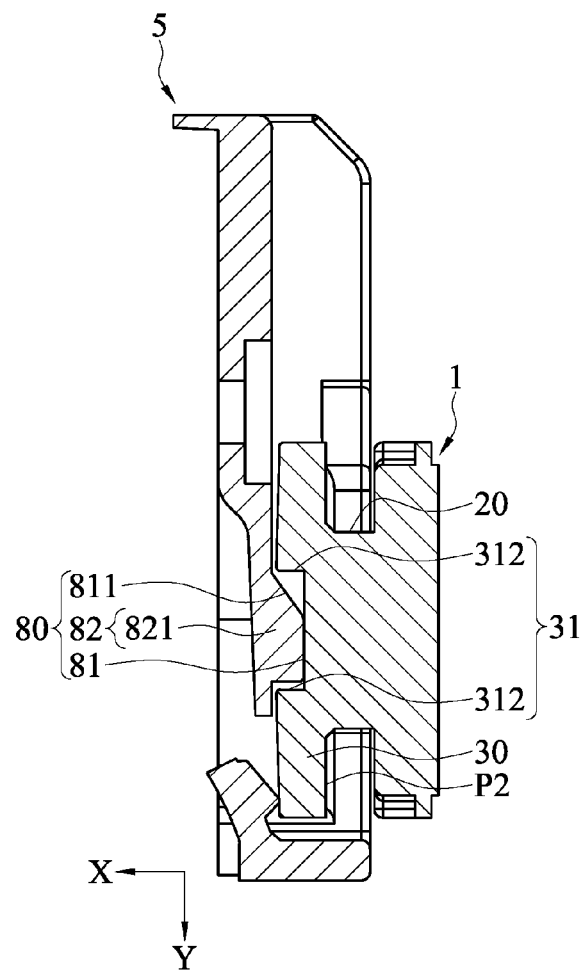
FIG. 16 is a fourth operation section view a connector according to the first embodiment of the present invention.
Figure 17:
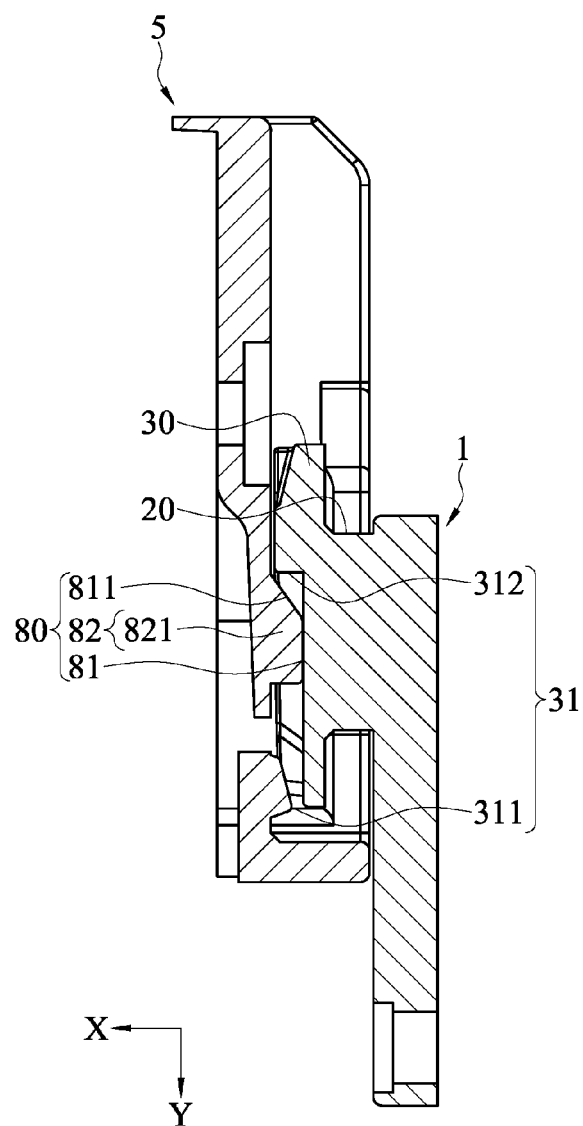
FIG. 17 is a fifth operation section view a connector according to the first embodiment of the present invention.

FIG. 8 shows a first operation diagram of a connector according to the first embodiment of the present invention. FIG. 9 shows a second operation diagram of a connector according to the first embodiment of the present invention. FIG. 10 shows a third operation diagram of a connector according to the first embodiment of the present invention. FIG. 11 shows a fourth operation diagram of a connector according to the first embodiment of the present invention. FIG. 12 shows a fifth operation diagram of a connector according to the first embodiment of the present invention. FIG. 13 shows a first operation section view of a connector according to the first embodiment of the present invention. FIG. 14 shows a second operation section view of a connector according to the first embodiment of the present invention. FIG. 15 shows a third operation section view of a connector according to the first embodiment of the present invention. FIG. 16 shows a fourth operation section view of a connector according to the first embodiment of the present invention. FIG. 17 shows a fifth operation section view of a connector according to the first embodiment of the present invention.

As shown in FIG. 1, FIG. 4, FIG. 8 to FIG. 10, and FIG. 13 to FIG. 15, when the first connector 1 is correspondingly assembled along the second direction (i.e., the y-axis direction) to the second connector 5, the connecting part 20 is inserted in the tapered positioning slot 71 and the coupling piece 30 is accommodated in the accommodating groove 72, and as shown in FIG. 15, the positioning portion 80 abuts against the closed end 312 of the coupling piece 30. As shown in FIG. 1, FIG. 9 and FIG. 14, while the connecting part 20 is being inserted in the tapered positioning slot 71, the open end 311 of the sliding channel 31 faces an opposite direction of the second direction (i.e., a negative direction of the y axis, the top of the drawing). At this point, a lower edge of the coupling piece 30 that protrudes more toward the first direction than the sliding channel 31 first presses against the positioning portion 80, and so the positioning portion 80 is deformed and moves along the first direction (i.e., the x-axis direction). As shown in FIG. 15, when the first connector 1 is pushed all the way to the end, the sliding channel 31 at this point corresponds to the location of the positioning portion 80. In FIG. 14, the positioning portion 80 that is pushed and deformed during the pushing of the first connector 1 can move along the opposite direction of the first direction (i.e., the negative direction of the x axis in this embodiment), restore its shape and be accommodated in the sliding channel 31, and have the bump 81 be abutting against the closed end 312 of the coupling piece 30. By abutting the positioning portion 80 against the closed end 312 of the coupling piece 30, the first connector 1 and the second connector 5 are bound together. After coupling, even if the first connector 1 is operated by applying a force in the opposite direction of the second direction, the closed end 312 of the coupling piece 30 abuts against the protrusion 81 of the positioning portion 80 and becomes incapable of moving further toward the opposite direction of the second direction, thereby preventing easy release of the connection between the first connector 1 and the second connector 5 during movement or daily use of the first connector 1 and the second connector 5.

As shown in FIG. 1, FIG. 4, FIG. 10 to FIG. 12 and FIG. 15 to FIG. 17, when the first connector 1 is to be separated from the second connector 5 after the first connector 1 has been assembled to the second connector 5, as shown in FIG. 10 to FIG. 12, the first connector 1 may be rotated by 180 degrees with the first direction as the axis of rotation (i.e., the x-axis direction), and the first connector 1 is moved along the second direction away from the second connector 5, such that the open end 311 of the sliding channel 31 is changed from facing upward to facing downward, as shown in FIG. 17. Because the open end 311 faces downwards (i.e., the positive direction of they axis), the originally limited protrusion 81 contained at the closed end 312 is released from the containment, such that the first connector 1 becomes capable of successfully moving toward the opposite direction of the second direction (i.e., the negative direction of the y axis), until the coupling piece 30 is disengaged from the accommodating groove 72.

More specifically, in this embodiment, after the first connector 1 has been assembled to the second connector 5, the direction from the closed end 312 to the open end 311 of the first connector 1 is opposite to the second direction (i.e., the negative direction of the y axis in this embodiment), the first connector 1 is rotated by 180 degrees relative to the second connector 5, and the direction from the closed end 312 to the open end 311 then changes to be the same as the second direction (i.e., the positive direction of they axis in this embodiment). Thus, when the first connector 1 is moved along a direction opposite to the second direction relative to the second connector 5 (i.e., during moving of the first connector 1 away from the second connector 5), the closed end 312 neither touches the position portion 80 nor causes deformation of the positioning portion 80, and the locking between the first connector 1 and the second connector 5 is easily released to separate the two. In other embodiments, the direction from the closed end 312 to the open end 311 of the first connector 1 may also be set to have an included angle relative to the second direction, e.g., 90 degrees, 120 degrees or 150 degrees. Accordingly, to separate the first connector 1 and the second connector 5, rotation of 90 degrees, 120 degrees or 150 degrees using the first direction as the axis of rotation needs to be first performed in order to achieve withdrawal and separation.

Thus, using the geometrical design of the structures of the first connector 1 and the second connector 5, deformation of the positioning portion (80, 80a) during the separation of the two is prevented by rotational withdrawal, so as to reduce the probability of permanent damage of the positioning portion (80, 80a) to thereby enhance the proper rate and durability of a product.

As shown in FIG. 1 and FIG. 2, the closed end 312 of the sliding channel 31 of the first connector 1 includes a first sloped surface 3121, a second sloped surface 3122, a first side surface 3123, a second side surface 3124 and a curved surface 3125. The first side surface 3123 is connected between the curved surface 3125 and the first sloped surface 3121, the second side surface 3124 is connected between the curved surface 3125 and the second sloped surface 3122, and a distance L3 between the first sloped surface 3121 and the second sloped surface 3122 gradually increases from the curved surface 3125 toward the open end 311. For example, in this embodiment, on an upper surface P1, a distance L31 between the first sloped surface 3121 and the second sloped surface 3122 at the open end 311 is more than a distance L32 between the first sloped surface 3121 and the second sloped surface 3122 at an intersection of the first sloped surface 3121 and the first side surface 3123 and an intersection between the second sloped surface 3122 and the second side surface 3124. Thus, by configuring the distance between the first sloped surface 3121 and the second sloped surface 3122 to be gradually increasing from the curved surface 3125 toward the open end 311, a user is allowed to adopt another assembly approach for better operation, wherein the another assembly approach is as described below. The open end 311 of the first connector 1 is aligned with the positioning portion 80 of the second connector 5 and is pushed along the second direction. With the guidance of the first sloped surface 3121 and the second sloped surface 3122, the positioning portion 80 is smoothly received in the sliding channel 31 and be pushed and positioned, and then to be rotated to complete the assembly. In this embodiment, the first sloped surface 3121 and the second sloped surface 3122 are symmetrical to each other, and the first side surface 3123 and the second side surface 3124 are symmetrical as well as parallel to each other. In some embodiments, the first side surface 3123 and the second side surface 3124 may be non-parallel and form an included angle with each other, for example, 30 degrees, 45 degrees or 60 degrees.

As shown in FIG. 4, FIG. 5, FIG. 9 and FIG. 14, in the first embodiment, the protrusion 81 of the positioning portion 80 has an inclined surface 811, which is away from the mobile end 821. In this embodiment, a half of the bump 81 is a cylinder in shape, and the other half is a trapezoidal block having the inclined surface 811 and is closer to the base plate 50 in a direction farther away from the mobile end 821. In other embodiments, the inclined surface 811 may also be an ellipsoidal inclined surface, a triangular inclined surface and other polygonal inclined surfaces.

As shown in FIG. 6 and FIG. 7, the protruding column 81a of the second embodiment has an inclined surface 811a on one end away from the elastic element 82a. In this embodiment, the protruding column 81a has one end as a cylinder in shape, and the other end as the inclined surface 811a that is a trapezoidal cylindrical inclined surface. In other embodiments, the inclined surface 811a may also be an ellipsoidal inclined surface, a triangular inclined surface and other polygonal inclined surfaces.

Thus, with the configuration of the inclined surface (811, 811a) on the positioning portion (80, 80a), when the first connector 1 is assembled along the second direction to the second connector 5, the coupling piece 30 is enabled to moved and deform the positioning portion (80, 80a) of the second connector 5 under the smooth guidance and pushing of the inclined surface (811, 811a).

As shown in FIG. 1 and FIG. 8 to FIG. 17, the first connector 1 further includes a guiding channel 40. The guiding track 40 includes an open side 41 and a closed side 42 that are opposite, and the direction from the closed side 42 to the open side 41 of the guiding channel 40 is different from the direction of the closed end 312 to the open end 311 of the sliding channel 31. Thus, with the configuration of the guiding channel 40, when the first connector 1 is assembled along the second direction to the second connector 5, the positioning portion 80 of the second connector 5 is smoothly guided and deformed toward the first direction (i.e., the x-axis direction). In this embodiment, the direction from the closed side 42 to the open side 41 of the guiding channel 40 is the same as the second direction (i.e., the same as the y-axis direction), and is opposite to the direction from the closed end 312 to the open end 311 of the sliding channel 31. In other embodiment, the direction from the closed side 42 to the open side 41 of the guiding channel 40 is equivalent to the second direction, and is at an included angle from the direction from the closed end 312 to the open end 311 of the sliding channel 31, for example, 90 degrees, 120 degrees or 150 degrees.

Further, as shown in FIG. 4 to FIG. 7, for whether the first embodiment or the second embodiment, end portions between the two side plates 60 of the second connector 5 are connected to each other to form a connecting end 61, which is provided with a guiding portion 611. In this embodiment, the guiding portion 611 includes a cantilever fixed at the connecting end 61, a free end of the cantilever is capable of reciprocal movement along the first direction (i.e., the x-axis direction), and the guiding portion 611 and the protrusion 81 of the positioning portion 80 both extend and protrude in a direction opposite to the first direction (i.e., the negative direction of the x axis). In this embodiment, when the first connector 1 is correspondingly assembled to the second connector 5, the guiding portion 611 is correspondingly received in the guiding channel 40. Thus, with the geometric matching between the guiding portion 611 of the second connector 5 and the guiding channel 40 of the first connector 1, a positioning effect is achieved when the two are being assembled; during a rotation process for separating the two, hand feel of operation can be provided by slightly resistance to remind the user of a rotation position. In some embodiment, the guiding portion 611 includes a compressible elastic member capable of reciprocal movement along the first direction. In other embodiments, the protrusion 81 of the positioning portion 80 extends and protrudes opposite to the first direction, while the guide portion 611 extends and protrudes in the first direction.

As shown in FIG. 1 and FIG. 15, the sliding channel 31 and the guiding channel 40 of the first connector 31 are located on the same plane on the coupling piece 30. In this embodiment, the sliding channel 31 and the guiding channel 40 are both located on the upper surface P1 of the coupling piece 30. In some embodiments, the sliding channel 31 and the guiding channel 40 of the first connector 31 are located on two opposite parallel surfaces on the coupling piece 30; for example, the sliding channel 31 is located on the upper surface P1 of the coupling piece 30 and the guiding channel 40 is located on the lower surface P2 of the coupling piece 30. In other embodiments, the guiding channel 40 may also in a quantity of two, which are respectively provided on the upper surface P1 and the lower surface P2.

Thus, by configuring the relative positions of the guiding channel 40 and the sliding channel 31 of the first connector 1 and the position of the guiding portion 611 of the second connector 5, multiple design approaches for restraining the first connector 1 and the second connector 5 are provided so as to respond to different product utilization requirements.

As shown in FIG. 4, FIG. 5, FIG. 15 and FIG. 16, the guiding portion 611 of the second connector 5 has an inclined surface 6111, which is away from the connecting end 61. In this embodiment, the inclined surface 6111 may be a trapezoidal sloped surface and face the mobile end 821. In some embodiments, the inclined surface 6111 may also be a triangular sloped surface, a rectangular sloped surface or other polygonal sloped surfaces. Thus, with the geometric matching between the inclined surface 6111 of the guiding portion 611 of the second connector 5 and the guiding channel 40 of the first connector 1, the two are allowed to be smoothly assembled to achieve a positioning effect. Moreover, during the rotation process for separating the two, rotation can be smoothly performed.

Figure 18:
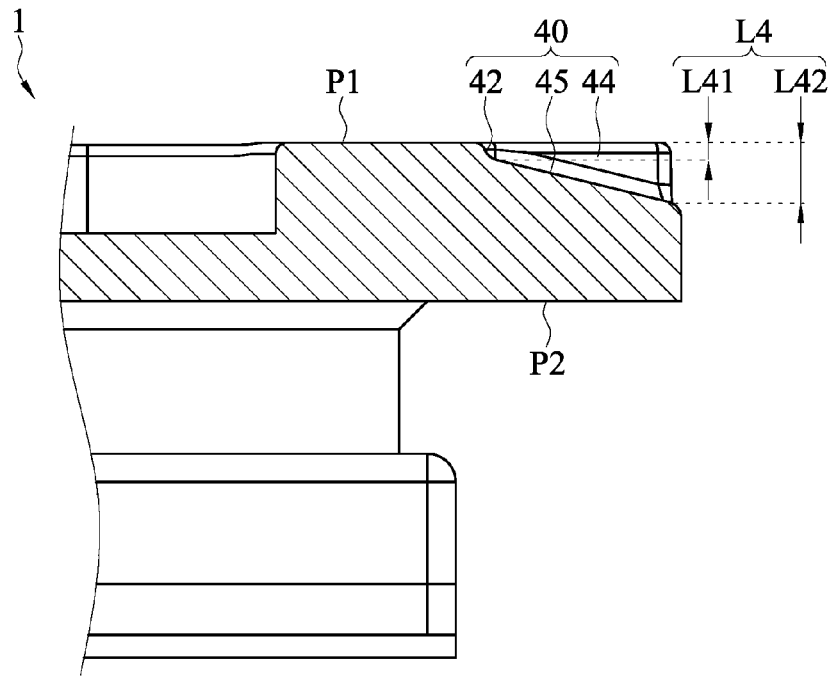
FIG. 18 is a partial section view of a first connector according to the first embodiment.

FIG. 18 shows a partial section view of a first connector according to the first embodiment of the present invention. As shown in FIG. 1 and FIG. 18, the guiding channel 40 of the first connector 1 further includes a first side portion 43 and a second side portion 44 that are opposite to each other, and a channel bottom 45 at the bottom of the guiding channel 40. The closed side 42 and the channel bottom 45 are connected to the first side portion 43 and the second side portion 44, and a depth L4 of the channel bottom 45 gradually increases from the closed side 42 toward the open side 41. In this embodiment, the depth L4 of the channel bottom 45 linearly increases from the closed side 42 toward the open side 41; for example, a depth L41 of the channel bottom 45 corresponding to the closed side 42 is less than a depth L42 of the channel bottom 45 corresponding to the open side 41. In other embodiments, the depth L4 of the channel bottom 45 may also gradually increase from the closed side 42 toward the open side 41 such that the channel bottom 45 appears as an arc in shape. Thus, during the assembly process of the first connector 1 along the second direction to the second connector 5, the open side 41, having a relatively larger depth, of the guiding channel 40 of the coupling piece 30 of the first connector 1 first touches the positioning portion 80, and is capable of guiding, as the depth gradually reduces, the positioning portion 80 to gradually displace, deform and move along the first direction, so as to at the same time enhance the proper rate of a product while reducing resistance of the assembly.

Figure 19:
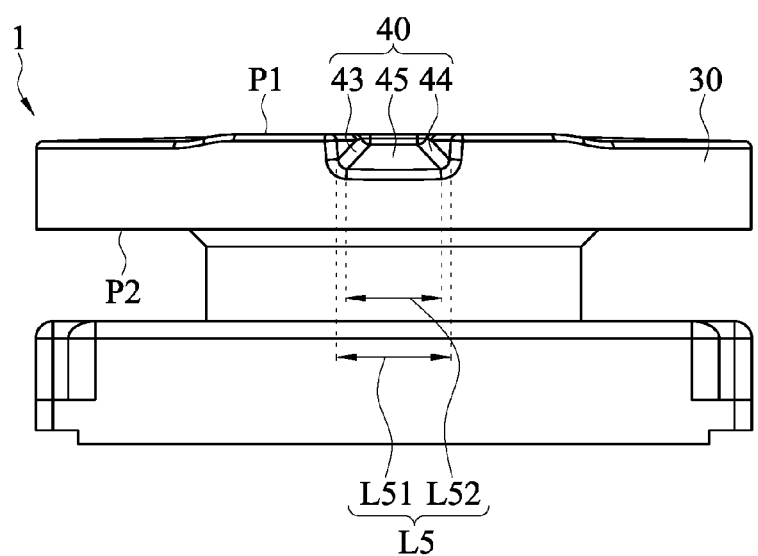
FIG. 19 is a side view of a first connector according to the first embodiment.

FIG. 19 shows a side view of a first connector 1 according to the first embodiment of the present invention. As shown in FIG. 1 and FIG. 19, a linear distance L5 between the first side portion 43 and the second side portion 44 of the guiding channel 40 decreases toward the channel bottom 45. In this embodiment, the linear distance L5 between the first side portion 43 and the second side portion 44 linearly decreases toward the channel bottom 45; for example, on the upper surface P1, a linear distance L51 between the first side portion 43 and the second side portion 44 on the outer periphery of the coupling piece 30 is more than a linear distance L52 between the first side portion 43 and the second side portion 44 on the channel bottom 45. In other embodiments, the outline between the first side portion 43 and the second side portion 44 may also be an arc, and the distance between the two gradually decreases toward the channel bottom 45. Thus, during the rotation process of the first connector 1 relative to the second connector 5, with the foregoing geometrical design of the guiding channel 40, the guiding channel 40 of the first connector 1 can be guided to smoothly depart from the guiding portion 611 of the second connector 5, so as to at the same time enhance the proper rate of a product while reducing the resistance generated during the rotation process.

As shown in FIG. 1 and FIG. 2, a distance L6 between the first side portion 43 and the second side portion 44 of the guiding channel 40 gradually increases from the closed side 42 toward the open side 41. In this embodiment, the distance L6 between the first side portion 43 and the second side portion 44 linearly increases from the closed side 42 toward the open side 41; for example, on the upper surface P1, a distance L61 between the first side portion 43 and the second side portion 44 at the closed side 42 is less than a distance L62 between first side portion 43 and the second side portion 44 at the open side 41. In other embodiments, the outlines of the closed side 42 and the first side portion 43 may also be an arc in shape, or be other geometric shapes. Thus, during the assembly process of the first connector 1 along the second direction to the second connector 5, the open side 41 having a larger relative width (i.e., the distance between the first side portion 43 and the second side portion 44) of the guiding channel 40 of the coupling piece 30 of the first connector 1 first touches the positioning portion 80, and as the width gradually decreases, the guiding portion 80 can be guided to gradually displace, deform and move along the first direction, so as to at the same time enhance the proper rate of a product while reducing the resistance generated during the rotation process.

In conclusion, the connectors provided by the embodiments of the present invention are capable of preventing, by means of rotational withdrawal, deformation of the positioning portion during a separation process, so as to reduce the probability of permanent deformation of the positioning portion to thereby improve the proper rate and durability of a product.

While the invention has been described by way of example and in terms of the embodiments, it is to be understood that the invention is not limited thereto. Changes and modifications be made by a person skilled in the art without departing from the spirit and scope of the present invention are to be encompassed within the scope of the present invention. Therefore, the scope of protection of the present invention should be accorded with the appended claims.

What is claimed is:

1. A connector, comprising:
   a base;
   a connecting part, having one end thereof connected to the base; and
   a coupling piece, arranged on one other end of the connecting part, the coupling piece comprising a sliding channel recessed into a top surface or a bottom surface of the coupling piece, the sliding channel comprising an open end and a closed end that are opposite to each other, the open end comprising a first opening on a side edge of the coupling piece;
   wherein a maximum linear distance of an outer periphery of the connecting part is less than a maximum linear distance of an outer periphery of the coupling piece;
   wherein the coupling piece further comprises a guiding channel recessed into the top surface or the bottom surface of the coupling piece, the guiding channel comprising an open side and closed side that are opposite to each other, the open side comprising a second opening in the side edge of the coupling piece, wherein a direction from the closed side to the open side of the guiding channel is different from a direction from the closed end to the open end of the sliding channel; and
   wherein the closed end of the sliding channel comprises a first sloped surface, a second sloped surface, a first side surface, a second side surface and a curved surface, the first side surface is connected between the curved surface and the first sloped surface, the second side surface is connected between the curved surface and the second sloped surface, and a distance between the first sloped surface and the second sloped surface gradually increases from the curved surface toward the open end of the sliding channel.

2. The connector according to claim 1, wherein the sliding channel and the guiding channel are respectively located on the top surface and the bottom surface of the coupling piece.

3. The connector according to claim 1, wherein the sliding channel and the guiding channel are located on a same one of the top surface and the bottom surface of the coupling piece.

4. The connector according to claim 1, wherein the guiding channel further comprises:
   a first side portion and a second side portion that are opposite to each other, and a channel bottom defining a bottom of the guiding channel;
   wherein the closed side and the channel bottom are connected to the first side portion and the second side portion, and a depth of the channel bottom gradually increases from the closed side toward the open side.

5. The connector according to claim 4, wherein a linear distance between the first side portion and the second side portion gradually decreases toward the closed side.

6. The connector according to claim 4, wherein a distance between the first side portion and the second side portion gradually increases from the closed side toward the open side.

7. The connector according to claim 1, further comprising:
   another connector, comprising an accommodating groove and a positioning portion, the positioning portion being arranged in the accommodating groove and adapted for reciprocal movement along a first direction;
   wherein, when the connector is assembled along a second direction to the another connector, the coupling piece is inserted in the accommodating groove and the positioning portion abuts against the closed end of the sliding channel; and while the connector is assembled to the another connector, after the connector is rotated by 180 degrees and the connector is moved along the second direction away from the another connector, the coupling piece is disengaged from the accommodating groove; and wherein the first direction and the second direction are perpendicular to each other.

8. The connector according to claim 1, further comprising:
another connector, comprising:
a base plate;
two side plates, arranged on the base plate, respective one ends of the two side plates being arranged parallel to each other;
a front plate, connected to the two side plates, the front plate comprising a tapered positioning slot, wherein the base plate, the two side plates and the front plate form an accommodating groove; and
a positioning portion, arranged on the base plate, adapted for reciprocal movement along a first direction perpendicular to the base plate;
wherein, when the connector is correspondingly assembled along a second direction to the another connector, the connector is inserted in the tapered positioning slot, the coupling piece is accommodated in the accommodating groove, and the positioning portion abuts against the closed end of the sliding channel; and
wherein the first direction and the second direction are perpendicular to each other.

9. A connector, comprising:
a base;
a connecting part, having one end thereof connected to the base; and
a coupling piece, arranged on one other end of the connecting part, the coupling piece comprising a sliding channel, the sliding channel comprising an open end and a closed end that are opposite to each other, the open end being located on one side edge of the coupling piece, wherein a maximum linear distance of an outer periphery of the connecting part is less than a maximum linear distance of an outer periphery of the coupling piece;
another connector, comprising an accommodating groove and a positioning portion, the positioning portion being arranged in the accommodating groove and adapted for reciprocal movement along a first direction;
wherein, when the connector is assembled along a second direction to the another connector, the coupling piece is inserted in the accommodating groove and the positioning portion abuts against the closed end of the sliding channel; and while the connector is assembled to the another connector, after the connector is rotated by 180 degrees and the connector is moved along the second direction away from the another connector, the coupling piece is disengaged from the accommodating groove;
wherein the first direction and the second direction are perpendicular to each other;
wherein the coupling piece further comprises a guiding channel, the guiding channel comprising an open side and a closed side located on opposite sides, wherein a direction from the closed side to the open side of the guiding channel is different from a direction from the closed end to the open end of the sliding channel; and
wherein the another connector further comprises a guiding portion arranged in the accommodating groove, and the guiding portion is correspondingly accommodated in the guiding channel when the connector is correspondingly assembled to the another connector.

10. The connector according to claim 9, wherein the guiding portion performs reciprocal movement along the first direction.

11. A connector, comprising:
a base;
a connecting part, having one end thereof connected to the base;
a coupling piece, arranged on one other end of the connecting part, the coupling piece comprising a sliding channel recessed into a top surface or a bottom surface of the coupling piece, the sliding channel comprising an open end and a closed end that are opposite to each other, the open end comprising a first opening on a side edge of the coupling piece; and
another connector, comprising an accommodating groove and a positioning portion, the positioning portion being arranged in the accommodating groove and adapted for reciprocal movement along a first direction;
wherein a maximum linear distance of an outer periphery of the connecting part is less than a maximum linear distance of an outer periphery of the coupling piece;
wherein the coupling piece further comprises a guiding channel recessed into the top surface or the bottom surface of the coupling piece, the guiding channel comprising an open side and closed side that are opposite to each other, the open side comprising a second opening in the side edge of the coupling piece, wherein a direction from the closed side to the open side of the guiding channel is different from a direction from the closed end to the open end of the sliding channel;
wherein, when the connector is assembled along a second direction to the another connector, the coupling piece is inserted in the accommodating groove and the positioning portion abuts against the closed end of the sliding channel; and while the connector is assembled to the another connector, after the connector is rotated by 180 degrees and the connector is moved along the second direction away from the another connector, the coupling piece is disengaged from the accommodating groove; and
wherein the first direction and the second direction are perpendicular to each other.

12. The connector according to claim 11, wherein the sliding channel and the guiding channel are respectively located on the top surface and the bottom surface of the coupling piece.

13. The connector according to claim 11, wherein the sliding channel and the guiding channel are located on a same one of the top surface and the bottom surface of the coupling piece.

14. The connector according to claim 11, wherein the guiding channel further comprises:
a first side portion and a second side portion that are opposite to each other, and a channel bottom defining a bottom of the guiding channel;
wherein the closed side and the channel bottom are connected to the first side portion and the second side portion, and a depth of the channel bottom gradually increases from the closed side toward the open side.

15. The connector according to claim 14, wherein a linear distance between the first side portion and the second side portion gradually decreases toward the closed side.

16. The connector according to claim 14, wherein a distance between the first side portion and the second side portion gradually increases from the closed side toward the open side.

17. A connector, comprising:
   a base;
   a connecting part, having one end thereof connected to the base; and
   a coupling piece, arranged on one other end of the connecting part, the coupling piece comprising a sliding channel recessed into a top surface or a bottom surface of the coupling piece, the sliding channel comprising an open end and a closed end that are opposite to each other, the open end comprising a first opening on a side edge of the coupling piece;
   another connector, comprising:
   a base plate;
   two side plates, arranged on the base plate, respective one ends of the two side plates being arranged parallel to each other;
   a front plate, connected to the two side plates, the front plate comprising a tapered positioning slot, wherein the base plate, the two side plates and the front plate form an accommodating groove; and
   a positioning portion, arranged on the base plate, adapted for reciprocal movement along a first direction perpendicular to the base plate;
   wherein a maximum linear distance of an outer periphery of the connecting part is less than a maximum linear distance of an outer periphery of the coupling piece;
   wherein the coupling piece further comprises a guiding channel recessed into the top surface or the bottom surface of the coupling piece, the guiding channel comprising an open side and closed side that are opposite to each other, the open side comprising a second opening in the side edge of the coupling piece, wherein a direction from the closed side to the open side of the guiding channel is different from a direction from the closed end to the open end of the sliding channel;
   wherein, when the connector is correspondingly assembled along a second direction to the another connector, the connector is inserted in the tapered positioning slot, the coupling piece is accommodated in the accommodating groove, and the positioning portion abuts against the closed end of the sliding channel; and
   wherein the first direction and the second direction are perpendicular to each other.

18. The connector according to claim 17, wherein the sliding channel and the guiding channel are respectively located on the top surface and the bottom surface of the coupling piece.

19. The connector according to claim 17, wherein the sliding channel and the guiding channel are located on a same one of the top surface and the bottom surface of the coupling piece.

20. The connector according to claim 17, wherein the guiding channel further comprises:
   a first side portion and a second side portion that are opposite to each other, and a channel bottom defining a bottom of the guiding channel;
   wherein the closed side and the channel bottom are connected to the first side portion and the second side portion, and a depth of the channel bottom gradually increases from the closed side toward the open side.

* * * * *